United States Patent Office 3,165,435
Patented Jan. 12, 1965

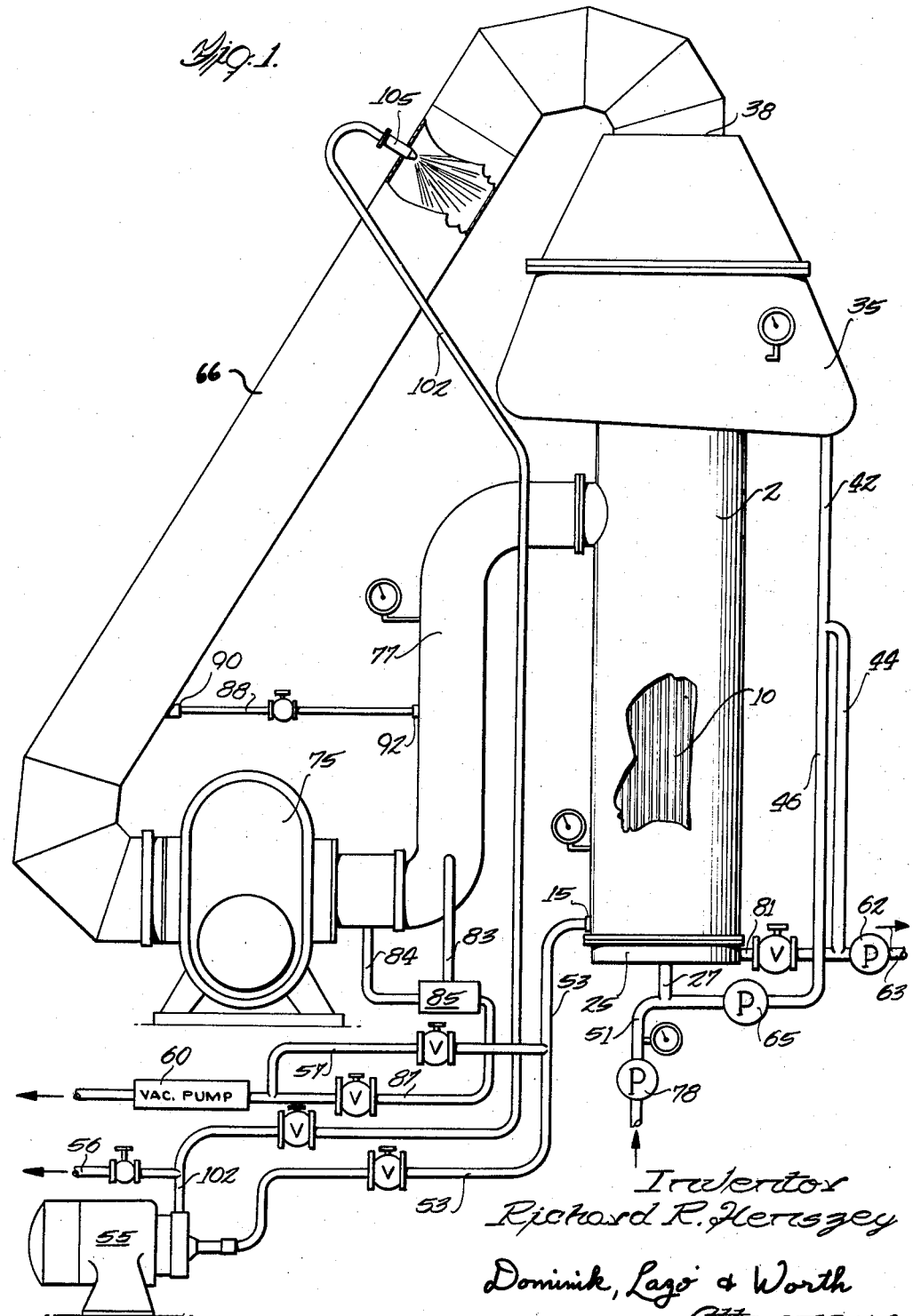

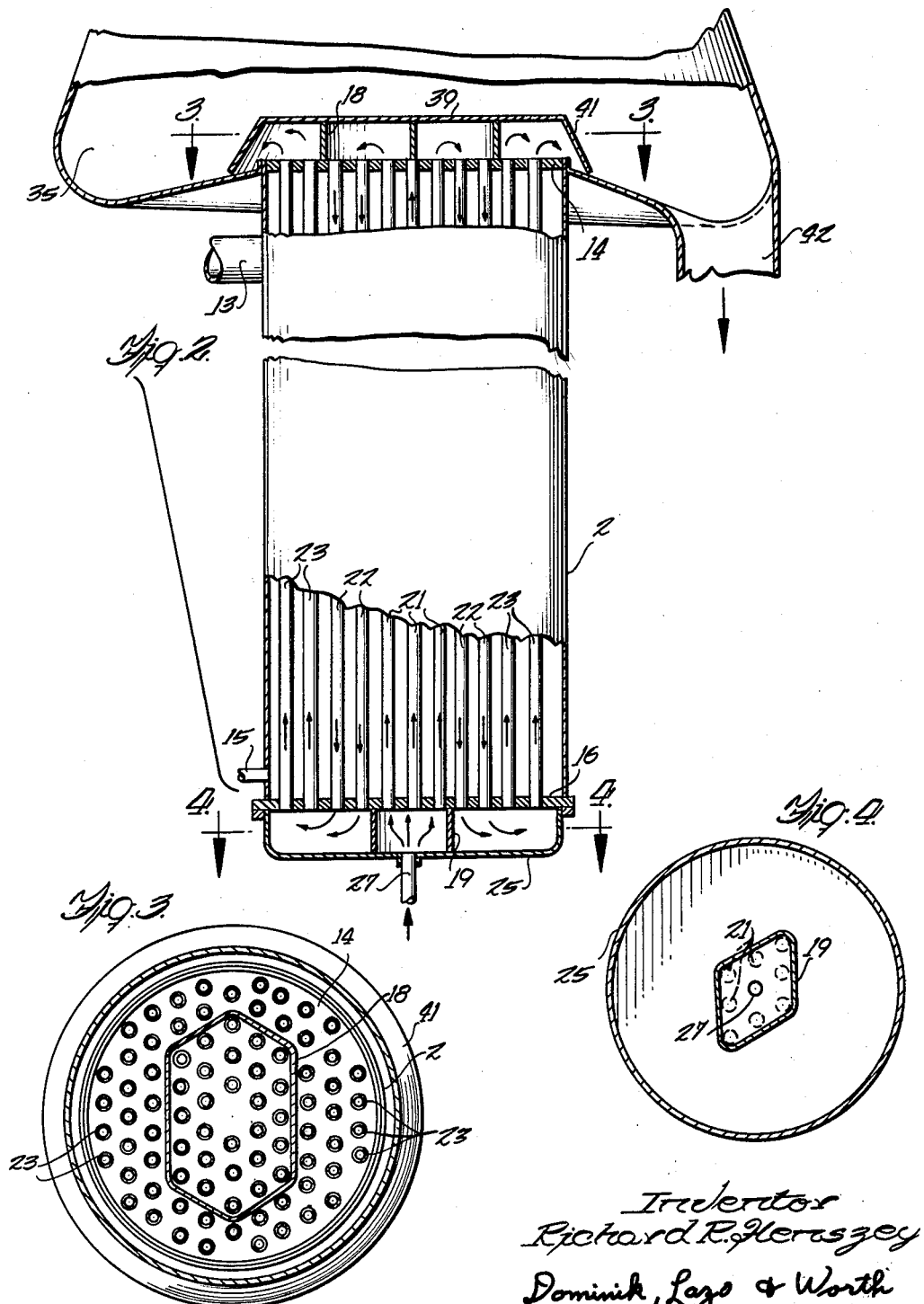

3,165,435
EVAPORATION APPARATUS AND METHOD
Richard R. Henszey, Oconomowoc, Wis., assignor, by mesne assignments, to C. E. Rogers Company, Detroit, Mich., a corporation of Michigan
Filed Jan. 19, 1961, Ser. No. 83,790
8 Claims. (Cl. 159—47)

The instant invention is a continuation-in-part of an application entitled "Apparatus and Method for Evaporation With High Heat Transfer Efficiency," Serial No. 49,705, filed August 15, 1960, now abandoned, by the present inventor.

This invention relates to an apparatus and method for evaporating a liquid with high heat transfer efficiency.

Generally, the evaporation of fluids to increase their solids content or alternatively to remove and recover a liquid free of solids requires massive equipment of complex design. With presently available apparatus such as the calandria type evaporator, the heat transfer coefficient of the water vapor (steam) on the outside surfaces of the tubes in the calandria is satisfactorily high. Similarly, it is not difficult to obtain high heat conductance through the tubes themselves by careful selection of tube material and thickness. A continuing problem, however, has been the relatively low heat transfer film coefficient of the product being concentrated. The film coefficient on the product side is substantially affected by the temperature of the operation, the viscosity of the liquid, the coating of the inner tube surfaces, and the velocity and turbulence of the liquid film. In addition, the boiling point elevation of a solution increases with concentration to effectively reduce the heat transfer relative to that of a pure liquid.

Heretofore, down-flow evaporators generally have been employed to overcome many of the difficulties associated with the effect of a decreasing heat transfer coefficient during the cencentration of a liquid. In such equipment, the fluid is introduced equally to all evaporating tubes and immediately flows down the tubes as a film propelled, as it descends, by vapor that is boiled off. By reason of the high velocity flow thus attained near the top of the tube, as well as the rest of the tube and from the lack of any boiling point elevation caused by the hydraulic head of any submergence, high heat transfer to the liquid is achieved. In the downflow evaporator, precision is required in distributing feed equally to each tube. If the distribution is unequal, some tubes will over-concentrate, some under-concentrate. The ones which over-concentrate may cause precipitation with resultant coating or plugging or may evaporate all water causing accumulation of all solids and plugging. Upflow evaporators, especially those with recirculation of the liquid many times through the tubes, do not require the precision feed distribution of the downflow, but have other problems. The worst of these is the stagnation of the liquid in the bottoms of the tubes until the level of boiling is reached. This stagnation reduces heat transfer and increases coating, etc. Forced circulation evaporators overcome the problems discussed above with upflow and downflow units, but require a large, expensive pumping arrangement, and in many cases have a lower heat transfer rate, except with considerable expenditure of mechanical energy.

The present invention obviates the above and other difficulties of the prior art and provides an evaporator construction which is neither bulky nor of execessive height for ease of installation on one level in buildings having normal ceiling levels, ease of access for cleaning, inexpensive to build and operate, and highly efficient thermally.

In broad outline, the instant invention provides an evaporation apparatus having a three-stage assembly of upright evaporating tubes extending through a jacket having improved vapor compression means for passing a heating fluid thereinto, and an improved method of evaporating a fluid in which the fluid is passed through three consecutive evaporating stages with a vapor flow exit velocity in each of the first two stages which is substantially equal to the vapor flow exit velocity in the third and last stage. In accordance with this invention, the three-stage assembly is formed of a first, second and third set of evaporating tubes arranged consecutively in substantially equalized exit velocity relationship. A vapor dome is provided closing the upper end of the jacket with a bottom chamber closing the lower end. At the bottom of the assembly, an inlet communicates with the first stage for introducing fluid to be evaporated in the apparatus. Means are provided at the top of the assembly for establishing communication between the first and second set of tubes and betwen the third set of tubes and the vapor dome. Additionally, means are provided at the bottom of the assembly establishing communication between the second set and the third set of tubes, whereby both liquid and vapor from a fluid being evaporated will initially pass upwardly through the first set of evaporating tubes, thereafter flow downwardly through the second set of tubes, and thence upwardly through the third set of tubes with a vapor flow exit velocity in each of the first two stages which is substantially equal to the vapor flow exit velocity in the third and last stage. By reason of the exceedingly high overall heat transfer values obtained with evaporators fabricated to incorporate the novel tube assembly described above, it is now possible to operate a complete evaporator unit without an extraneous source of steam for heating the calandria. No heating fluid other than the vapor evolved from the feed liquid by evaporation need be utilized in the evaporation process. This is accomplished by compressing the hot vapors of distillation and using the compressed vapor as a heating medium for the evaporator tubes. It has now been found that the efficiency and stability of the vapor compression system can be greatly increased even when evaporating to a high solids content by the injection of a spray of liquid aqueous fluid into the separated vapor in an amount substantially in excess of that required to saturate such vapor even after it has passed through the compressor, that is, substantially in excess of that required to eliminate superheat from the separated vapor before it enters the compressor as well as such superheat as is put into the vapor during the compression step. In view of the exceedingly low concentration of solids which are generally entrained in vapor evolved from the evaporating tubes of high efficiency evaporators, this discovery is entirely unexpected.

By "liquid aqueous fluid" is meant water or a dilute water solution in the liquid state which is sprayed into the vapor evolved from the evaporation process to dissolve, suspend or otherwise disperse solids which have been entrained in the vapor. Most preferably, the liquid aqueous fluid untilized in the vapor spray will be a distilled water or watery solution; that is, an aqueous fluid from which impurities have been separated by distillation. Aqueous solutions which have been softened by other processes may be equivalent to distilled water in softness if they are dead soft and the only inorganic constituents contained therein are metal salts such as sodium and potassium salts, which will not form insoluble precipitates during the vapor compression process.

Liquid aqueous fluid sprayed into the evolved vapor in accordance with the instant invention preferably is injected at a temperature which is about equal to or greater than the temperature of the vapor of the evaporation process on the inlet side of the compressor. In this connection, it is obvious that if the temperature of the "water" spray is too low, the vapor used for regenerative heating will be cooled unnecessarily with accompanying loss of efficiency in the process. If the temperature of the sprayed liquid is above that of the vapor, flash occurs adding heat to the system. Generally, the temperature of the injected liquid aqueous fluid will be in the range of from about 0° to 5° F. below to about 0° to 10° F. above the temperature of the evolved vapor which is treated. If desired, this temperature can be regulated to further control and balance the heat losses of the system and stabilize the evaporator within very narrow temperature limits.

It is a feature of the present invention that the distilled water or the watery solution which has been distilled off the liquid material being evaporated and then condensed to the liquid state is a preferred source of liquid aqueous fluid for the vapor spray. This liquid is highly distilled, has a strong affinity for the solids content of the vapor into which it is sprayed and is produced at a temperature which is generally just somewhat above the temperature of the vapor having the entrained solids.

Surprisingly, it has now been found that the efficiency of the regenerative heating process utilizing mechanical recompression of vapor evolved from the evaporation process, can be very markedly improved by injecting liquid aqueous fluid into the separated vapor in an amount substantially in excess of that required to saturate the separated vapor even after passing through the compressor.

The amount of liquid which must be sprayed into the vapor depends somewhat upon the material being evaporated and whether or not high solids content products are being produced. In general, the amount of liquid injected by spraying will be in the range of from 10 to 100 times that necessary to saturate the vapor at the temperature of the vapor at the outlet of the compressor and remove the superheat. More preferably, in the range of 10 to 30 times that amount of water will be utilized.

As used herein, the term "substantially equalized vapor flow exit velocity" refers to the exit velocity of the vapor being evolved out the ends of the evaporating tubes in each of the three stages of the assembly. This exit velocity in each case will vary inversely with the total cross sectional area of the evaporating tubes making up that particular stage or pass of the evaporator. In accordance with the present discovery, optimum heat transfer efficiency is obtained when the vapor generated in each of the first and second stages of the novel evaporator assembly has been equalized with the third stage, i.e., it leaves each of the first and second stages at a velocity which is at least substantially equal to the exit velocity of vapor leaving the third stage. In some instances, these exit velocities can be in the range of from 1 to 2 times as great as the exit velocity of vapor leaving the third stage of the evaporator. Most advantageously, however, the vapor flow exit velocity from all three stages will be substantially equal. The above result is accomplished by limiting the total cross sectional area of the tubes in the first stage to in the range of from 5 to 15 percent of the total cross sectional area of all evaporating tubes employed in the apparatus and arranging the tubes in an assembly in which the total cross sectional area of all evaporating tubes employed in the second stage is greater than the total cross sectional area of the tubes in the first stage, but smaller than the total cross sectional area of the tubes in the third and final stage.

The ratios of cross sectional area between the evaporating tubes of the three stages are obtained by control of the number of tubes employed, or by the internal diameter of the tubes, or both, as required for predetermined conditions of operating temperatures and pressures in accordance with the well-known formulae relating to heat coefficients.

Selecting the relationship of the heating surface for the three passes largely is determined by the considerations which follow. First of all, the exit velocity from the third stage should not be any higher than practical considerations of size and cost permit as an excessive exit velocity can cause some difficulties in entrainment separation in the vapor dome and other entrainment separators. On the other hand, excessive velocites in the first and second passes cause a frictional resistance which will cause a boiling temperature at a point in the first and second passes higher than that of the dome. Excessive frictional resistance, for instance in the second and third passes, can cause a rise in the boiling temperature sufficient to partially or wholly preclude evaporation in the first pass. Because of the above-mentioned difficulties, the best compromise between high heat transfer coefficients and entrainment difficulties has resulted with the cross section areas of the passes arranged for approximately the same exit velocity of the vapor.

As is pointed out in the discussion of the tests that follow, a total head of the combined submergence, hydraulic head and friction losses of about half of the height of the first pass of tubes can easily be maintained by the proper arrangement of the three passes, such total head being measured as the difference in pressure from the feed connection entering the bottom of the first pass and the pressure in the vapor dome above the exit of the third pass. It follows, therefore, that as there are obviously frictional resistances through the tubes of the various passes plus the hydraulic head of the liquid vapor mixture upward through the third pass, the level to which the liquid rises in the first pass until it is heated to the boiling point must therefore be substantially less than half of the height of the first pass. This means, therefore, that the high film velocity associated with the release of water vapor is in existence in well over half the length of the first pass.

If the feed to the vaporator is at such a temperature that it will boil or flash at a pressure equal to the pressure in the vapor dome over the third pass plus the head of half of the height of the first pass, the liquid film velocity and turbulence will originate at the very bottom of the first pass and continue through all three passes.

As frictional resistance caused by velocities are undesirable because of the reduction in the effective temperature difference available for heat transfer, velocities are chosen which are just high enough to give high heat transfer to the liquid film with a resulting minimum of frictional resistance from this velocity. In addition, the exit velocities should not be excessive from the third pass because of entrainment considerations. There are no general rules which apply to the selection of velocities mentioned above as each product varies in viscosity, heat sensitivity, boiling point rise, value, and many other factors. Thus, if a relatively inexpensive product is handled, the operator might choose to run at exit velocities with resulting entrainment that would not be desirable on a more expensive product. With velocities chosen which result in a low frictional resistance through the three passes, and where the elevation of the boiling point due to concentration is not significantly changed through the three passes, the heat transfer rate will be approximately equal per square foot of heating surface in all three passes. The first pass, however, must receive special consideration because the temperature of the feed may be at a point below, equal, or above the boiling point at the pressure existing in the inlet of the tubes in the first pass.

In an evaporator with identically-sized tubes throughout, it has been shown that if the feed to the first pass is low enough in temperature so that there is no flash, then the outlet velocity of this pass cannot be as high as that of the third pass. With the above conditions, the evaporation in a tube in the first pass can only about equal the evaporation in the third pass. This evaporation causes a particular exit velocity which can be equal in both cases, but the third pass has an inlet velocity of the vapor and product from the second stage, while the first pass has only the relatively slow inlet velocity of the feed. As the outlet velocity is the combination of the velocity of evaporated vapor plus the inlet, in the above case, the velocity of the third pass is greater than the first.

In the first pass, it would be possible to use smaller diameter tubes where there is greater surface area per unit of cross sectional area and so obtain a higher exit velocity, but this perfection is not required and does not add any substantial performance unless the inlet is particularly cool. In extreme cases, however, it can be considered.

As the object of the design is generally to improve efficiency and operate with efficient evaporator schemes, the most usual condition will be with the inlet temperature close to the evaporation temperature, for example, within 2–15 degrees of the evaporation temperature. Preferred ratios of tubes under the normal conditions covered above are ratios in which the total cross sectional area of the tubes in the first, second and third stages respectively are 1:2–4:6–9. Specific examples include 1:3:9, 2:5:15, 1:2:6, 6:24:54, 9:20:55.

In the present evaporator, the construction utilized embodies the thermal advantages of both the downflow type and the rising-film type of evaporator while avoiding disadvantageous features of both. By admitting the liquid feed to only in the range of from 5 to 15 percent of the total tube area of the assembly, the upward velocity in the first stage is between five and fifteen times as great as could be obtained with a conventional rising-film evaporator without recirculation. With such an exceedingly high upward velocity, the heat transfer rate per unit area in the bottom of the tubes can be increased to the point where the liquid reaches the boiling point before it has traversed the first stage of the evaporator, preferably in the first one-third of the first set of tubes. At this point, vapor is released and a film of liquid is blown up the walls of the tubes.

From the above, it can be seen that generally less than 2–7 percent of the evaporator tubes will be submerged in liquid during operation. This is in contrast with a figure of from 15–90 percent submergence generally obtained with conventional rising-film units. In such prior units, the liquid in the tubes causes a higher pressure at the bottom of the tubes so that the liquid is often heated to a temperature higher than the dome temperature before boiling is achieved. The area below which the liquid is not boiling is, of course, characterized by a very low velocity of product and a resulting very low heat transfer rate. Further, if scaling conditions are present, a particularly heavy coating generally results because of the stagnation and the elevated temperature.

Suitable vapor compressors for use with tube assemblies arranged in substantially equalized exit velocity relationship include any of the readily available mechanical, fluid, or steam-jet compressor pumps. Generally, however, it will be most advantageous to employ a mechanical compressor of the type having a plurality of rotating lobes, and the instant invention is primarily directed to the improvement of such compression systems obtained by the use of an aqueous liquid spray as described herein. The low pressure side of the compressor unit is attached in communication with the vapor chamber at temperature $T_1$ and the high pressure side attached to discharge into the calandria at temperature $T_2$. Preferably, a temperature differential in the range of 5° to 25° F. is employed. Most advantageously, dome temperatures will be in the range of from about 10° to 20° F. lower than the temperature of the compressed vapors used for heating the evaporating tubes. Temperature differences greater than 25° F., requiring a high ratio of compression, are not required with the present apparatus because of the unusually high heat transfer efficiency obtainable in the evaporator unit, even when evaporating viscous products and products with high solids content limited only by the boiling point rise. Excellent heat transfer rates are obtained when the net temperature difference, after subtracting the boiling point rise from the gross temperature difference, is as low as 5° F. or up to 25° F. or more.

Broadly, any liquid material containing one or more vaporizable components can be treated in the high efficiency evaporator of the present invention. The method and apparatus can be employed with sea water or with various other substances such as milk, whey, organic pulps or juices containing suspended solids of a fibrous nature, and the like. Because of the high vapor flow velocities through the evaporating tubes, however, the present apparatus is particularly suited to the handling of organic materials sensitive to heat treatment. The method discovered makes possible rapid concentration by evaporation, with minimum volume of the material within the evaporating cycle at any one time, and with a minimum time period of heat treatment within the sensitive range of temperature. Milk being one of the liquids most commonly undergoing evaporation on a large, commercial scale, the following discussion is directed specifically to milk as being a product exemplary of a fluid which can be treated according to the instant invention, with the understanding that the invention has application also to other products presenting like problems.

Preferably, the liquid, e.g., milk, which is to be concentrated is preheated, as with conventional heat exchange apparatus, before it is supplied by means of a suitable pump to the first stage of the tube assembly. Milk arriving from storage will ordinarily be at a temperature of approximately 40° F. and will be heated, for example, to at least about 158° F. before being admitted to the evaporator.

When the evaporator is set in its normal operation, there will be a predetermined temperature and pressure differential between the evaporating stages and the condenser which will automatically be maintained. For example, using compressed vapor the vapor temperature in the jacket can be approximately 160° F. but under the influence of the partial vacuum produced in the vapor chamber, the temperature of the vapor evolved from the milk may be of the order of 140° F. or, if it is desired to make a "low heat" product, it can be maintained at another temperature such as 120° F.

Preferably, it is desirable to supply the liquid feed material to the first stage evaporating tubes at a temperature at which, at the reduced pressure existing therein, there will immediately be some "flash" expansion with evolution of vapor. This is accomplished by preheating the feed liquid to a temperature above the temperature existing in the vapor dome under normal stable operating conditions. Excess heat must be removed from the system. As the system employs regenerative heating, vapors from the evaporator are recompressed and cannot be used to carry heat out of the system. Accordingly, the amount of "flash" is generally controlled to just balance the natural heat losses to the environment. In this case, the liquid feed preferably is preheated to a temperature in the range of about 1° to 5° F. above or below the temperature of the vapor being evolved during evaporation.

The novel features which are believed to be characteristic of the invention, both as to its organization and method of operation, together with further objects and advantages thereof, will be understood more clearly and fully from the following description considered in connection with the accompanying drawings, in which:

FIGURE 1 is a schematic elevation of an evaporator incorporating a high-efficiency tube assembly with vapor compression system including an aqueous liquid spray, exemplifying, for illustrative purposes, one embodiment of the subject invention;

FIGURE 2 illustrates diagrammatically in vertical section the evaporating tube assembly of the evaporator of FIGURE 1;

FIGURE 3 is a horizontal cross sectional view of the upper portion of the tube assembly of FIGURE 2, taken along section line 3—3; and FIGURE 4 is a horizontal cross sectional view of the lower portion of the tube assembly of FIGURE 2, taken along section line 4—4.

Referring to the drawings in detail, FIGURE 1 shows an evaporator incorporating one embodiment of the instant invention. The high efficiency evaporator construction comprises a tubular jacket or calandria casing 2 into which a compressed vapor heating fluid can be admitted at inlet 13 and from which condensate and vapor can be discharged at outlet 15. The jacket can be suitably heat-insulated as desired. In some instances it may be desirable to employ inner baffles in a conventional manner to aid circulation of the fluid heating medium throughout the calandria thus providing for even evaporation over the entire area of the calandria. Generally, however, under equilibrium operating conditions, heat gradients within the calandria casing will be minimal and essentially uniform temperatures can be maintained throughout the jacket without the necessity of such baffles or other associated equipment.

As can be seen more readily from a consideration of FIGURE 2, a generally cylindrical, upright tube assembly 10 is mounted in heat exchange relationship in the jacket 2 with all evaporating tubes terminating at upper and lower tube sheets 14, 16 which serve as closures for the top and bottom, respectively, of jacket 2. In the instant embodiment, the tube assembly 10 of the evaporator comprises a multiplicity of individual evaporating tubes which are positioned concentrically in three sets 21, 22 and 23, about the longitudinal axis of the calandria casing 2 to provide a three-pass evaporating system assembled in essentially equalized exit velocity relationship. The middle set of tubes 22 surrounds the innermost set 21 at the center of the bundle and separates the innermost set 21 from the outermost set of tubes 23 which, in turn, surrounds the middle set 22. A pass separator cap 18 is provided on the upper tube sheet 14 across the upper ends of all the evaporating tubes in the innermost and middle set 22 for causing the incoming liquor flowing up the inner set of tubes 21 to flow down the middle set 22. A dished bottom chamber 25 is sealed to the lower end of the calandria casing and the lower tube sheet 16, providing interconnection between tubes of the middle set 22 and outermost set 23 by means of pass separator 19. Fluid inlet 27 extends through the dished bottom 25 and communicates with the innermost set of evaporating tubes 21 whereby the fluid to be evaporated can be admitted to the first pass of the assembled sets of evaporating tubes.

In accordance with the method of the present invention, in order to obtain efficient heat-exchange operation with a fluid to be evaporated in an upright three-pass system, it is essential that the exit velocity of vapor flow in the first pass (innermost set of tubes) and in the second pass (middle set of tubes) be about equal to the exit velocity of vapor flow in the third pass (outermost set of tubes), that is, the three sets of evaporating tubes must be assembled in equalized exit velocity relationship for predetermined operating temperatures and pressures. This can be accomplished by providing an assembly of upright evaporating tubes in which the total cross sectional area of all evaporating tubes employed in the middle set of tubes is greater than the total cross sectional area of the tubes of the innermost set, but smaller than the total cross sectional area of the tubes of the outermost set.

Sealed to the top of calandria casing 2 is a vapor dome 35 provided with a vapor outlet port 38 for withdrawing the vapors separated from the liquor by the evaporation process. While dome 35 has been illustrated as having a frusto-conical configuration having at its base an annular upwardly convex operative surface, it is to be understood that other vapor-collecting chambers or passages of conventional design can be similarly employed. Because ebullition from the several tubes of the outermost set of evaporating tubes 23 will be quite violent with both liquid and vapor being discharged from the top of the pipes, a generally horizontal baffle plate can be provided which is disposed above the tubes and extends radially over them. Advantageously, an umbrella-shaped baffle or canopy 39 supported by pass separator cap 18 is provided which baffle extends laterally over the ends of the evaporating tubes 10 but is spaced from them. The baffle 39 is provided with a depending flange 41 which extends downwardly to the approximate plane of the upper tube sheet 14 to facilitate separation of vapor from liquid in fluid impinging against the baffle. The lower margin of the flange 41 can be located at various levels such as to be slightly above the level of the tube sheet or considerably beneath, but in either case leaving an annular cylindrical passage all around the top of the casing. In operation, the liquid jetted with the vapor from tubes 23 strikes the baffle 39 and tends to be discharged radially outwardly and downwardly in a thin sheet from the margin of the baffle. This sheet of liquid strikes flange 41 and is broken up into individual streams whereby the vapor stream traveling at very high velocity is able to escape without entraining an excessive amount of liquid. In some instances, it can be desirable to provide the umbrella baffle with depending vanes, blades or the like in the manner well known in evaporator manufacture to further reduce entrainment of liquid particles.

The concentrate formed in the several stages accumulates in the annular base portion of the vapor dome and after being withdrawn from collector 42 can be directed through line 44 to storage or, if desired, recycled through the apparatus through line 46.

It is understood that the present apparatus is provided with numerous conventional valves, pumps, and control devices necessary to regulate the flow of the various media and to maintain the several components at desired temperatures and pressures and that the selection of such devices for use with the subject evaporator is well within the skill of the art of those to whom the present description is directed.

FIGURE 1 illustrates a preferred embodiment of the evaporator system in which the tube assembly is utilized in combination with a regenerative heating unit utilizing a spray of liquid aqueous fluid. No heating fluid other than the vapor evolved from the feed liquid by evaporation is utilized in the evaporation process. Vapors evolved from the evaporation process through outlet 38 are carried through vapor pipe 66 to a suitable vapor compressor 75 from which compressed vapor is discharged into heating jacket 2 through vapor pipe 77. Milk to be evaporated is injected at high velocity into the first stage of the evaporator tube assembly by means of pump 78 through line 51 communicating with fluid inlet 27. Evaporated product can be removed from a suitable product collector 42 through line 44 by means of a liquid product pump 62 discharging through line 63, to storage, another evaporating effect, or a spray dryer, or the like. If desirable, a portion of the liquid product stream can be diverted for recirculation through line 46 and through variable-speed pump 65. A drain line 81 can be utilized to remove liquid from the bottom chamber 25 during cleaning operations.

Non-condensables are removed from the heating jacket at outlet 15 through line 57 and discharged to drain by means of vacuum pump 60 utilized to partially evacuate the entire system. Liquid drainage from the vapor compressor 75 is provided through a suitable float valve 85 and then through lines 83, 84 and 87, to drain condensate from the bottom of vapor compressor 75. In this embodiment, all the vapor is carried from the dome through vapor pipe 66 to the vapor compressor 75 and thereafter used as a means of supplying heat for further evaporation to the calandria jacket 2. Bypass line 88 communicating with vapor pipe 66 at outlet 90 and vapor pipe 77 at outlet 92 permits equalization of pressures during start-up of the compressor and is generally desirable to reduce the starting load on the compressor motor.

Condensate from the calandria, that is, condensed vapor from the evaporation process—cow water—is a most preferred source of liquid aqueous fluid for the vapor spray system of the instant invention. This condensate is removed, in the present embodiment, through line 53 by means of condensate pump 55 and a portion thereof discharged through line 102 to spray nozzle 105 (of conventional design) whereby a liquid spray of distilled water can be directed into the evolved vapor before it reaches the compressor 75. Excess condensate is discharged to drain through line 56. It will be understood, of course, that the illustration is not only diagrammatic, but purely by way of exemplifying one possible organization for the practice of the invention utilizing the novel liquid spray system described above.

To more fully illustrate the invention, the following examples are presented. It is to be understood that these are given for illustrative purposes only and are not to be construed as limiting in any way the scope of the present invention.

EXAMPLE I

In this example, an evaporator tube assembly having 84 one-inch stainless steel tubes each 6 feet in length was employed in the manner illustrated diagrammatically in FIGURE 1. The innermost upwardly-flowing evaporating stage was formed of 9 evaporating tubes. Twenty tubes were used in the middle downwardly-flowing stage and 55 evaporating tubes were employed in the outermost upwardly-flowing stage. A vacuum pump of conventional design (Nash No. H3) was used to pull a vacuum on the unit and to remove condensate as a wet vacuum pump. Temperatures in the vapor dome and in the compressed vapor in the calandria were taken by means of thermometers placed directly in the dome and two-thirds of the way down from the top of the calandria. Both were calibrated at 160° F.

All tests were run to determine the K value, that is, B.t.u. per hour per square foot per degree Fahrenheit over lengthy periods of operation. In this example, spray means for injecting liquid aqueous fluid into the vapor conduit were not employed. Initially, skim milk from a hotwell was fed to the evaporator at a temperature somewhat above the evaporation temperature existing in the tube assembly under the reduced pressure therein. Part of the evaporated milk was returned to the hotwell and the rest fed through the preheater to the evaporator with a recirculation rate of about 1.5:1. The purpose of this arrangement was to increase the total amount of liquid entering and leaving the evaporating tubes which had a high solid content and to maintain thorough wetting of the tube surfaces. The condensed cow water was also returned to the hotwell where it was mixed with the concentrate and the resulting mixture fed to the evaporator. Density was controlled by varying the proportion of recirculated concentrate and mixture from the hotwell. An essentially constant dome temperature and therefore suction pressure was automatically maintained to the compressor. By the use of a conventional displacement-type compressor, evaporation was maintained at a substantially uniform rate simply by maintaining the inlet temperature and pressure uniform. The actual temperatures at which the unit stabilized in operation were controlled by varying the feed temperature of the liquid milk fed to the evaporating assembly and the degree of evacuation achieved by the vacuum pump.

During the first hour of evaporation in which the feed and withdrawal Baumé values and the operating temperature of the unit was adjusted stabilization was achieved. During the second hour of operation, a 17 degree temperature differential was maintained across the evaporator tubes with approximately 18 horsepower at a rate of 700 pounds evaporation per hour. The resulting K value of 330 up to the two-hour point was very satisfactory. This was obtained with a calandria temperature of approximately 146.5° F. and a dome temperature of approximately 129.5° F. During this period, the compressor motor drew approximately 45 amps. The temperature of the feed from the hotwell at 8.5° Baumé was 135° F. Withdrawal Baumé was approximately 20.0°.

Subsequent operation of the evaporation process resulted in loud, violent pumping of the compressor which was of sufficient severity to cause the shutting down of the apparatus. This test clearly shows that in the case of prolonged operation with high solids content liquids, it is necessary to inject liquid aqueous fluid into the separated vapor in amounts substantially in excess of that required to saturate the separated vapor even after passing through the compressor, in order to obtain efficient evaporation. While this discovery is not fully understood, it is believed that entrained solids in the vapor, the concentration of which may be only in the order of about one to two one-hundredths of 1%, become glazed or jelled on the lobes or impellers of the vacuum compressor and very rapidly build up to the point where the compressor cannot operate efficiently without readjustment of the internal clearance.

EXAMPLE II

The above example illustrates the eventual breakdown of a vapor compressor after many long hours of operation during which the evaporating tubes were heated with vapors evolved from the evaporation process which had been compressed without the use of a water spray in accordance with the instant invention. During the final two hours of evaporation, the difficulties with the compressor increased to the point where further operation would be destructive.

In order to determine more accurately the effect of injecting liquid aqueous fluid into the separated vapor prior to the compression of the vapor, the mechanical compressor was completely cleaned and carefully readjusted for optimum performance. Thereafter, the following tests were run, again without the use of an injected spray of water or watery solution with an evaporator containing 9, 20 and 55 tubes in the three passes assembled as shown in FIGURES 1 and 2. The unit was operated with skim milk over an extended period of time to condense the milk to a 42% solids liquid using recompressed vapors of evaporation as the heating fluid for the calandria jacket.

Initially, 500 pounds of skim milk were added to a hotwell and fed to the evaporator at a temperature somewhat above the evaporation temperature existing in the tube assembly under the reduced pressure therein. In Run A, part of the evaporated milk was returned to the hotwell and the rest fed through the preheater to the evaporator. In this run, the condensed cow water was also returned to the hotwell where it was mixed with the concentrate and the resulting mixture fed to the evaporator. Density was controlled by varying the proportion of recirculated concentrate and mixture from the hotwell. An essentially constant dome temperature and therefore suction pressure was automatically maintained to the compressor. By the use of a conventional displacement-type compressor, evaporation was maintained at a substantially uniform rate simply by maintaining the inlet temperature and pressure uniform. The actual temperatures at which the unit stabilized in operation was controlled by varying the feed temperature of the liquid milk fed to the evaporating assembly, and the degree of evacuation achieved by the vacuum pump.

Run B was a duplicate in almost all respects of Run A, except that raw skim milk was used instead of recirculating the same skim over again. In this instance, 12,000 lbs. of raw skim which had been unheated in any way except for separating was drawn from a tank truck to the preheater. The feed temperature was maintained at such a point as to result in 130° F. dome temperature (comparable with Run A), which was also the equivalent temperature and pressure on the suction of the compressor. The feed pump was fed a combination of recirculated concentrate and raw skim at a rate of approximately 2,500 pounds per hour.

Run C was a continuation of Run B at a higher feed temperature and therefore dome temperature. Results are given in Table I.

*Table I*

| Operating Conditions | Run | | |
|---|---|---|---|
| | A | B | C |
| Inlet Temperature, °F | 146 | 146 | 160 |
| Dome Temperature, °F | 130 | 130 | 140 |
| Calandria Temperature, °F | 148 | 148 | 161 |
| Compressor Motor Current, amps | 44 | 44 | 56 |
| Feed Rate, lbs./hr | 3,090 | 2,500 | 2,500 |
| Withdrawal, Baumé [1] | 18–22 | 19–21.5 | 20.5–23 |
| Compressor,[2] H.P. | 16.6 | 17 | 22.5 |
| Rate of Evaporation, lbs./hr | 703 | 703 | 935 |
| Coefficient of Performance, lbs./H.P. | 42.3 | 41.4 | 41.5 |
| K (B.t.u./hr./sq.ft./°F) | 308 | 308 | 350 |

[1] Baumé:
    20@130° F.=41.3% solids.
    22@130° F.=45.3% solids.
[2] Roots Compressor:
    Model 10×20 RAS Roots-Coversville Blower.
    Motor 25 H. P., 220 volt, 61 amps @240 v. full load.
    Compressor overall thermal efficiency=approximately 45%.

The above example clearly shows the surprising high heat transfer values obtainable with the three-pass assembly of evaporating tubes described above, even while operating with an exceedingly low temperature differential. That the unit was affected only moderately by changes in solids is indeed unexpected, i.e., 39 amps on water, 44 amps on 42% solids and 45 amps on 45% solids. Further, from the above it can be seen that approximately 100 pounds of evaporation can be obtained by 2 H.P. on the compressor. In Run C, with the same vapor exit velocities as in Runs A and B, a much higher K was obtained with no reduction in the coefficient of performance even with an increase of 3° in compression ratio. This is an increase of 17% showing the effect of the higher operating temperature on heat transfer, and with a greater overall temperature difference, the more net temperature difference (T.D.) after subtracting boiling point rise. The tests definitely indicate the desirability of operating at as high a temperature as possible, limited in this case only by the heat-sensitive material.

In the three tests above, operation after several hours indicated that the runs could be continued indefinitely without a noticeable decrease in the K value. Further operation, however, made it clear that the disassembly and careful cleaning of the vacuum compressor had only temporarily solved the problem. After the thumping in the compressor recurred, it became continuous until it was so violent that only by rapidly reducing the speed of the compressor, was it possible to continue the evaporation process. As will be shown in Example III, this problem was completely eliminated by injecting liquid aqueous fluid as a spray into the vapor conduit in amounts substantially in excess of that required to saturate the separated vapor.

EXAMPLE III

In a series of experiments, in the manner of Example II, skim milk was evaporated in accordance with the instant invention which comprised injecting in the range of about from ⅓ to 1 lb. of water per hour for every lb. of vapor compressed per hour. This had the result of completely eliminating the compressor thumping problem and obviated the necessity for constant adjustment and/or cleaning of the compressor. For example, in a 16 hour test with high milk solids, total evaporation averaged 650 lbs. per hour. During this time, approximately 350 lbs. per hour of the distilled condensate was pumped back into the evolved vapor on the inlet side of the compressor. The above tests clearly showed that the injection of these amounts of water not only suppressed the superheat and provided seal water for increased efficiency at the compressor impellers but, at the same time, diluted or solvated all the entrained solids in the vapor to eliminate the tendency of these to adhere to the working surfaces of the vapor compressor. As a result of this discovery, it is now possible to operate a regenerative heating evaporator continuously for hundreds of hours without experiencing any difficulties in the compressor by reason of buildup of entrained solids from the vapor which are trapped on the compressor surfaces.

EXAMPLE IV

In this example, neutralized whey was evaporated to a solids concentration of approximately 60 percent utilizing the evaporator described in Example II. The equipment was operated continuously for a period of approximately 24 hours, during which time the compressor was observed through a sight glass as the solids concentration increased. Feed pressure of the whey was held constant at about 5 lbs. per sq. in. with a ¼ inch orifice admitting product to the first pass. A 10 x 21 Roots compressor driven by a 25 H.P. motor at 625 r.p.m. was utilized to compress the vapors evolved from the evaporation process. During the evaporation, 0.67 gallon per minute of the distilled condensate was pumped into the vapor pipe through the spray nozzle.

The temperature of the feed at the inlet during the 24-hour run was in the range of 143° to 150° F. Dome temperature varied between 128° and 138° F. The calandria temperature over this period ranged between 143° and 156° F. At the end of 24 hours, at which time the tests were discontinued, the unit was operating smoothly and the compressor was observed to be completely free of coating from the entrained solvents in the vapor.

EXAMPLE V

In this example, commercial corn syrup was treated in the manner of Example IV, operating at approximately 80 percent solids (43 degrees Brix). During the entire evaporation process, distilled condensate from the calandria was sprayed into the vapor pipe in an amount equal to approximately ⅔ of a gallon per minute. A high heat transfer value of $K=130$ at 43 degrees Brix was obtained using a delta T of approximately 27° F. represented by average dome and calandria temperatures of 139° and 166° F., respectively. During this time, net evaporation ranged between about 424 to 457 lbs. per hour. Observation of the compressor through a sight glass during operation made it clear that there was no coating in evidence either during or after the run.

The above examples clearly illustrate the surprising utility of the present discovery and the unexpected improvement obtained by injecting a liquid aqueous fluid into the separated vapor in amounts substantially in excess of that required to saturate the vapor on the outlet side of the compressor.

It is to be understood that the above-described arrangements and techniques are but illustrative of the application of the principles of the invention. Numerous other arrangements and procedures obviously can be devised by those skilled in the art without departing from the spirit and scope of the invention.

What is claimed is:

1. A method of evaporating in apparatus having first, second and third columns arranged consecutively and having successively larger cross sectional areas correlated to produce substantially equal exit velocities of a fluid flowing through the columns, said method comprising the steps of passing a liquid feed upwardly through said first evaporating column, maintaining a reduced pressure in said first evaporating column sufficient to produce boiling in the liquid at a predetermined evaporating temperature, passing all said liquid and vapors evolved therefrom downwardly through said second evaporating column and thence upwardly through said third evaporating column, continuously supplying liquid feed to said first evaporating column at a rate sufficient to establish a vapor flow exit velocity in said first and second evaporating columns which is at least equal to the exit velocity of vapor being discharged from the third evaporating column, separating a liquid product from vapor issuing from said third evaporating column, injecting a liquid spray into the separated vapor in amounts substantially in excess of that required to saturate the separated vapor at said evaporating temperature whereby entrained solids are diluted to substantially eliminate the tendency to adhere to the working surfaces of a vapor compressor, compressing the separated vapor arising from said liquid product, and passing the compressed vapor in heat exchange proximity to the liquid flowing through said evaporating columns to heat said evaporating columns and maintain a temperature therein which is above said evaporating temperature.

2. The method according to claim 1 wherein said spray liquid is water.

3. The method according to claim 1 wherein condensate from the compressed vapor used to heat said evaporating columns is utilized as a source of spray liquid.

4. An evaporator having, in combination, a jacket providing fluid inlet and outlet ports, a multiple stage assembly of evaporating tubes extending through the jacket and formed of at least first and second sets of spaced evaporating tubes having cross sectional areas correlated so that the velocity of fluid flowing first through said first set and then through said second set of tubes will be at least as great as the fluid leaves the first set as it is when the fluid leaves the second set, an inlet communicating with one end of said first set of tubes for introducing therein fluid to be evaporated, means at the other end of said first set establishing communication between the first set and one end of said second set of tubes, a chamber at the other end of said second set of tubes providing a vapor dome communicating with the other end of the set and having a vapor outlet, a vapor conduit in communication with said vapor outlet for withdrawing vapor from said chamber, liquid spray means connected to said vapor conduit for injecting liquid spray into the conduit and including a regulator for adjustment of the liquid aqueous fluid to an amount substantially in excess of that required to saturate the vapor being withdrawn from said chamber, and vapor compressing means for compressing vapor withdrawn through said vapor conduit and injected with said spray and for delivering the compressed vapor at a higher temperature to said inlet port of said jacket.

5. The combination of claim 4 in which said liquid spray means includes a conduit in communication with the outlet port of said jacket whereby condensate from the heating fluid delivered to said jacket is utilized as a source of said spray liquid.

6. In a method of evaporating a liquid in apparatus including a plurality of columns arranged consecutively and having successively larger cross sectional areas correlated to produce substantially equal exit velocities of a fluid flowing successively through the columns, said method comprising the steps of passing a liquid feed through a first one of said columns, maintaining a reduced pressure in said first column sufficient to produce boiling in the liquid at a predetermined evaporating temperature, passing said liquid and vapor evolved from said first column through a subsequent one of said columns, continuously supplying liquid feed to said first column at a rate sufficient to establish a vapor flow exit velocity in the first column which is at least equal to the exit velocity of vapor being discharged from said subsequent column, separating vapor from a liquid product of the fluid issuing from said subsequent column, injecting a liquid spray into the separated vapor in amounts substantially in excess of that required to saturate the separated vapor at said evaporating temperature whereby entrained solids are diluted to substantially eliminate the tendency to adhere to the working surfaces of a vapor compressor, compressing the separated vapor into which said liquid spray has been injected, and passing the compressed vapor in heat exchange proximity to the liquid flowing through said evaporating columns to heat said columns and maintain a temperature therein which is above said evaporating temperature.

7. In a method of evaporating a liquid containing components vaporizable under reduced pressure and elevated temperatures, the steps of passing a liquid feed through a column, maintaining a reduced pressure in said column sufficient to produce boiling in the liquid at a predetermined evaporating temperature, separating vapor from a liquid product of the fluid issuing from said column, injecting a liquid spray into the separated vapor in amounts substantially in excess of that required to saturate the saturated vapor at said evaporating temperature whereby entrained solids are diluted to substantially eliminate the tendency to adhere to the working surfaces of a vapor compressor, compressing the separated vapor which is arising from said liquid product and into which said liquid spray has been injected, and passing the compressed vapor in heat exchange proximity to the liquid flowing through said column to heat the column and maintain a temperature therein which is above said evaporating temperature.

8. The method of claim 7 in which said spray liquid is introduced into the separated vapor at a temperature equal approximately to the temperature of said compressed vapor.

References Cited by the Examiner

UNITED STATES PATENTS

| 2,453,859 | 11/48 | Pugh | 34—75 |
| 2,741,303 | 4/56 | Bergstrom | 159—27 X |
| 2,895,546 | 7/59 | Sadtler | 159—24 |

FOREIGN PATENTS

| 609,488 | 5/26 | France. |
| 1,155,216 | 11/57 | France. |
| 115,469 | 12/00 | Germany. |
| 436,240 | 10/26 | Germany. |

NORMAN YUDKOFF, *Primary Examiner.*

CHARLES O'CONNELL, *Examiner.*